May 6, 1969
H. SCHÖNEMEYER ET AL
3,443,034
TEST CIRCUIT FOR TELEPHONE SWITCHING NETWORK HAVING COMMON CONTROLS
Filed July 13, 1965
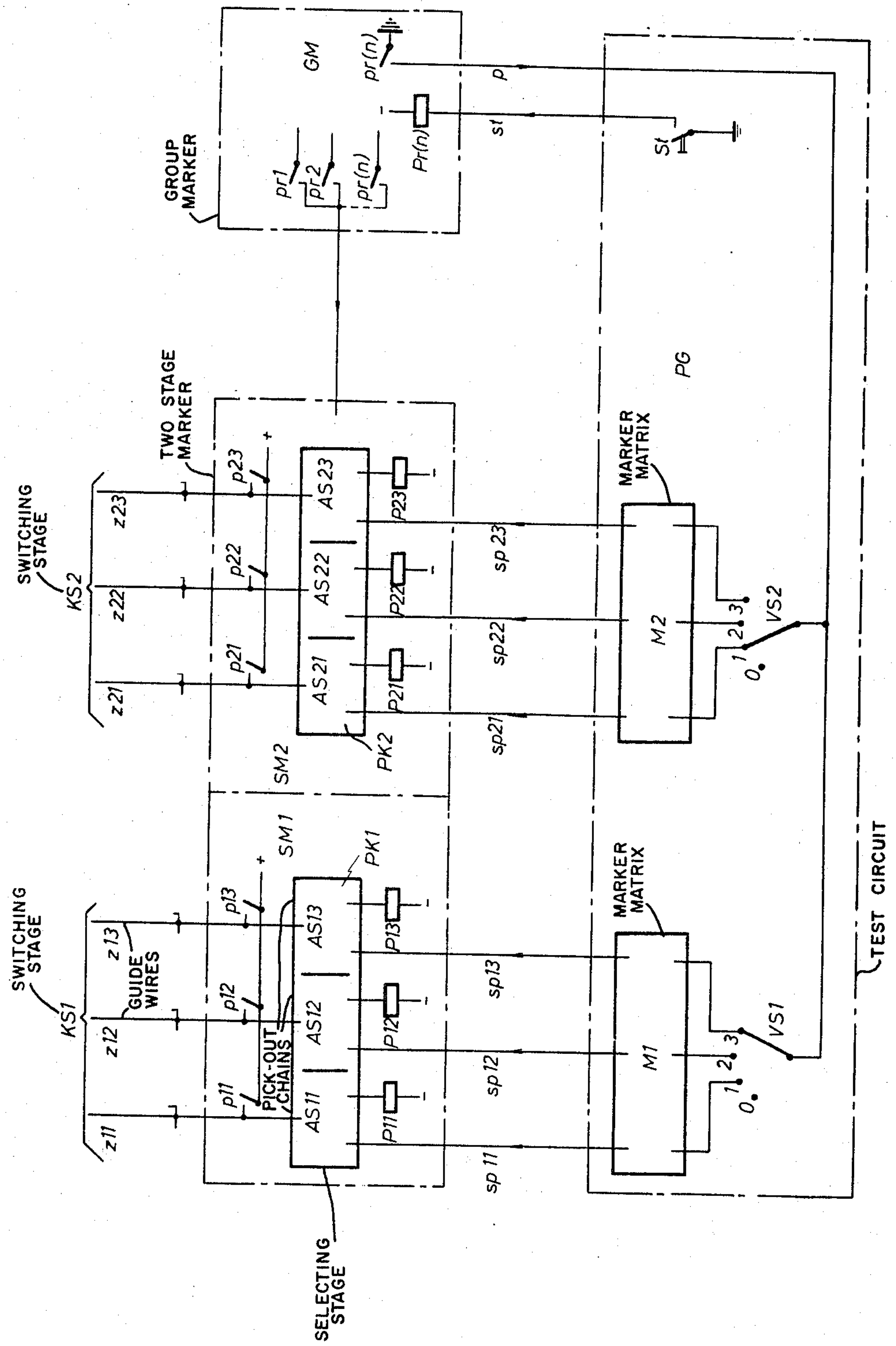

United States Patent Office

3,443,034

Patented May 6, 1969

3,443,034

TEST CIRCUIT FOR TELEPHONE SWITCHING NETWORK HAVING COMMON CONTROLS

Hilmar Schönemeyer, Ditzingen, and Norbert Kollermann, Sandweg, Germany, assignors to International Standard Electric Corporation, New York, N.Y., a corporation of Delaware Filed July 13, 1965, Ser. No. 471,520
Claims priority, application Germany, July 23, 1964, St 22,448
Int. Cl. H04m *3/00*
U.S. Cl. 179—18 4 Claims

ABSTRACT OF THE DISCLOSURE

The invention provides a test circuit for a telephone switching network having common controls. The test circuit includes a switch and a matrix interposed between a control point and the common controls. When the switch is set to a particular position, the matrix fans out a busy signal to all except one of the path selection leads available to the common controls. This forces the common controls to select the non-busy marked desired path. These synthetic busy markings have no effect upon existing paths which are already marked busy—a second busy potential applied in parallel with a first busy potential does not cause any change.

The invention relates to a circuit for testing connections in switching systems, having switching grids controlled by markers.

In order to test the functional capability of a switching grid, it is necessary to establish a connection through such a switching grid. This mode of testing is difficult when the switching grids are controlled by markers, because test connection is established over arbitrarily selected crosspoints in the several switching stages. When the input and output of a certain switching grid is busy, the connection is established over another one of the many possible routes. Hence, if the busy condition is due to a failure rather than to a true busy status, the existence of a fault will not be detected.

In order to force the switching grids to use the specific crosspoints that are desired for a defined test connection, it is possible to directly actuate the individual crosspoint elements by the specific selection of either keys or dial switches. The cost for such a testing device is uneconomic, however, because all crosspoints of the entire switching network must then be provided with individually associated contacts for making the connection. Centralization of these selection contacts at the inputs of the switching grid is impossible. The intermediate leads between stages are seized in a random selection. Therefore, even with a specific crosspoint selection, it is not always possible for each intermediate lead, or a definitely selected one, to be available at any given moment from a selected one of the inputs.

When the switching grid has separate marking means for each intermediate lead, connection selections can be made through additional switching means. If these switching means put a simulated busy marking on all intermediate leads except the one which is selected, the central marker is forced to make the desired selection. Such a testing facility requires fewer contacts, but additional control means must be provided in the switching grid in order to obtain a presetting of the busy marking means.

Accordingly, an object of the invention is to provide an improved circuit arrangement for selecting a specific route for the establishment of switch paths in telephone exchange switching systems. Here, an object is to provide a testing system which can be used independently of the regular arrangement of the switching grid. Another object is to provide for such testing either with artificial busy marking per intermediate lead or in a switching network with guide wires. A still further object is to avoid requiring an expenditure in widely extending the switching grid.

According to the invention, the test circuit arrangement is characterized in this that preadjustable switching means are connected with the markers of the system. The selective switching means of the markers are actuated in a defined manner by setting the switching means. Through this measure, the contacts are reduced to a minimum number, and the enforced selection of the partial route is controlled through the pick-out chain of the marker itself, where the pick-out chain is formed by the selecting stage of the marker. The preset switching means are concentrated in a testing device which is connected with the markers, and these means provide for an establishment of a test connection via soldering pins or plugs. The effect of the switching means (on the pick-out switching means of the marker) depends on an indication from the testing device. In the pick-out chain of the marker, only one selecting means is affected by the preset switching means. Thus, the connection is advanced over only a part of the route. The testing device becomes particularly simple if only one marker is provided for the multistage switching grid, and if that marker successively controls the setting of the individual switching stages. To establish the defined test connection, the pick-out chain of this marker is successively brought into positions determined by several switching means.

The above mentioned and other features and objects of this invention and the manner of obtaining them will become more apparent, and the invention itself will be best understood by reference to the following description of an embodiment of the invention taken in conjunction with the accompanying drawings, in which the invetion is explained with the aid of a exemplary schematic switching system shown on the accompanying single sheet of drawings.

Two stage markers SM1 and SM2 serve two switching stages KS1 and KS2. The switching grid is equipped with guide wires in a known manner. All idle guide wires z11 to z13 and z21 to z23 conduct offering potential. These wires are led to the stage markers SM1 and SM2.

The markers contain testing chains PK1 and PK2, which include a selecting stage AS11 to AS13 and AS21 to AS23—a stage for each outgoing line. Each stage AS11 . . . etc., is respectively associated with a succeeding relay P11 to P13, and P21 and P23. The function of the markers pick-out chains PK may vary according to system design, but this is unimportant to the testing circuit arrangement constructed according to the invention. The marker selections can be made successively or in parallel.

The inventive test circuit PG includes a number of switches VS1, VS2 which are connected through matrices M1, M2 to the markers SM1, SM2. When a test connection is established in a defined control group, the test device PG operates the switches VS1 and VS2 and is thereby connected via wires *sp*11 to *sp*13 and *sp*21 to *sp*23 to the markers SM1 and SM2 and a pertinent group marker GM. The starting lines *st* and *p* are required to start the test procedure. Signals sent from group marker GM over wire *p* and the preselecting switch VS1 and VS2, define a test connection which is selected through the switching stages KS1 and KS2.

To conduct the test, the start button St is pushed to seize the control group marker GM. A control potential is applied over wire *p* to the preselecting switches VS1 and VS2, respectively. The matrices M1 and M2, following the preselecting switches VS1, VS2 apply a blocking potential to blocking lines *sp*11 to *sp*13 and *sp*21 to *sp*23 for the selecting stages AS11 to AS13 and AS21 to AS23, depending on positions of the switches VS1 and VS2. When the switch VS1 is in position 3, for example, the selecting stages AS11 and AS12, in the stage marker SM1, are blocked via the wires *sp*11 and *sp*12. Only the selected stage AS13 can respond in the switching stage KS1. The following relay P13 operates its contact *p*13 and applies an access potential to the intermediate line *z*13.

The conditions are similar when setting the switching stage KS2. If the pre-selecting switch VS2 is in position 1, signals through the matrix M2 block the stages AS22 and AS23 of the stage marker SM2. The selecting stage AS21 then operates relay P21 which selects the intermediate line *z*21 by closing contacts *p*21.

The switching stages KS1 and KS2 can be set either simultaneously or successively. This essentially depends on the arrangement of the switching grid and the route searching network.

If several switching stages are controlled by a suitably constructed marker, only one test chain is necessary. This test chain is successively connected through separate switches with the intermediate leads of the different switching stages. In such a marker the preselecting switches VS1, VS2 become effective onto the pick-out chain of the marker in the same sequence.

While the principles of the invention have been described above in connection with specific apparatus and applications, it is to be understood that this description is made only by way of example and not as a limitation on the scope of the invention.

We claim:

1. In a telephone switching network having common controls, the combination comprising: a plurality of path selection wires extending from said network to said common controls, means for selecting one of said wires, matrix means interposed between said selecting means and said wires for fanning out a simulated busy signal to all except the selected one of said wires, and means for placing a demand for a switch path upon said common controls whereby said common controls are forced to select the one of said wires which does not then have said simulated busy signal thereon.

2. The combination of claim 1 wherein said matrix means is connected to a path selection means in said common controls in parallel with the selection wires whereby said common controls operate in the same manner regardless of whether the busy signals are simulated signals or actual busy signals.

3. The combination of claim 1 wherein the common controls include a pick-out chain means for selecting non-busy paths, and means responsive to signals from said matrix means for operating a predetermined one of said pick-out chain means.

4. The combination of claim 1 and a single marker for a multistage network, and means responsive to said selecting means for causing said marker to operate each of said stages in succession.

References Cited

UNITED STATES PATENTS 2,741,663 4/1956 Oberman ---------- 179—18.7
3,351,721 11/1967 Voegtlen et al. ---- 179—175.21

WILLIAM C. COOPER, *Primary Examiner.*